United States Patent
Buckley et al.

(10) Patent No.: US 6,252,626 B1
(45) Date of Patent: Jun. 26, 2001

(54) TEST AND ALIGNMENT SYSTEM FOR ELECTRONIC DISPLAY DEVICES

(75) Inventors: Eric S. Buckley, Scarborough; Bruce W. C. Lee, Markham; Branko Bukal, Toronto; Wayne G. Dawe, Richmond Hill; Andrew G. Noonan, Oshawa; Todd R. Richardson, Scarborough, all of (CA)

(73) Assignee: Image Processing Systems, Inc., Ontario (CA)

( * ) Notice: Subject to any disclaimer, the term of this patent is extended or adjusted under 35 U.S.C. 154(b) by 0 days.

(21) Appl. No.: 08/750,522

(22) PCT Filed: Jun. 13, 1995

(86) PCT No.: PCT/CA95/00352

§ 371 Date: Mar. 25, 1997

§ 102(e) Date: Mar. 25, 1997

(87) PCT Pub. No.: WO95/34906

PCT Pub. Date: Dec. 21, 1995

Related U.S. Application Data (63) Continuation-in-part of application No. 08/259,309, filed on Jun. 13, 1994.

(51) Int. Cl.$^7$ .................................................. H04N 17/04
(52) U.S. Cl. ........................ 348/189; 348/190; 348/180; 348/806
(58) Field of Search .................................... 348/189, 190, 348/191, 180, 806, 807, 813; 356/222, 402, 408, 425, 121; H04N 17/00, 17/04

(56) References Cited

U.S. PATENT DOCUMENTS

| | | |
|---|---|---|
| 3,962,722 | 6/1976 | Ciciora . |
| 4,330,779 | 5/1982 | Wilensky et al. . |
| 4,415,921 | 11/1983 | Mulvanny et al. . |

(List continued on next page.)

FOREIGN PATENT DOCUMENTS

| | | |
|---|---|---|
| 404 700 | 12/1990 | (EP) . |
| 0 577 380 A1 | 1/1994 | (EP) . |
| 2 255 700 | 11/1992 | (GB) . |
| WO 93/06694 | 4/1993 | (WO) . |
| WO 95/34906 | 12/1995 | (WO) . |

OTHER PUBLICATIONS

Article by Robert Lin, Jr. entitled "Automated CRT Inspection and Alignment" in *Information Display*, vol. 4, pp. 16–17 (1988) Jun. New York, US.

Article by Sung Rak Kim et al. entitled "Design and Implementation of an Automatic Adjustment System for Integrated Tube Components" in *Mechatronics*, vol. 4, No. 1, pp. 1–23 (1994).

Proceedings of 1986 International Conference on Industrial Electronics, Control & Instrumentation (IECON), by T. Hibara et al., entitled "Automatic Adjustment for Color Display Monitor", pp. 164–169, Milwaukee, MN, US.

*Primary Examiner*—John K. Peng
*Assistant Examiner*—Jean W. Désir
(74) *Attorney, Agent, or Firm*—Venable; Robert Kinberg (57) ABSTRACT

Apparatus and methods for system and method for testing and aligning a CRT which can sequentially perform all of the tests needed to precisely align the CRT and provide real-time feedback for operator adjustments. The system can integrate each of the measurements and automatically verify measurements previously performed as required. An improved color CCD camera is also provided which can maintain focus irrespective of variations in the thickness and glass curvature of the CRT screen. Further, photodiode optical filter and lens assemblies and wobulator assemblies can be incorporated into the system to further improve the testing and aligning of the CRTs.

16 Claims, 10 Drawing Sheets

U.S. PATENT DOCUMENTS

| | | |
|---|---|---|
| 4,575,753 | 3/1986 | Mistry et al. . |
| 4,602,272 * | 7/1986 | Duschl ................................ 348/191 |
| 4,688,079 * | 8/1987 | Fendley ............................... 348/190 |
| 4,736,251 * | 4/1988 | Sasaoka ............................... 358/505 |
| 4,751,570 | 6/1988 | Robinson . |
| 4,754,329 | 6/1988 | Lindsay et al. . |
| 4,760,444 | 7/1988 | Nielson et al. . |
| 4,804,845 * | 2/1989 | Takeuchi ............................. 250/367 |
| 4,814,858 | 3/1989 | Mochizuki et al. . |
| 4,855,838 * | 8/1989 | Jones et al. ........................... 348/84 |
| 4,884,129 * | 11/1989 | Ozawa et al. ........................ 348/242 |
| 4,893,925 | 1/1990 | Sweeney et al. . |
| 4,897,721 * | 1/1990 | Young et al. ........................ 348/190 |
| 4,963,828 * | 10/1990 | Kawame et al. ..................... 324/404 |
| 4,988,857 * | 1/1991 | Karasawa et al. ................... 250/205 |
| 5,032,769 * | 7/1991 | Kawakami ..................... 315/368.11 |
| 5,049,791 * | 9/1991 | Kawakami ..................... 315/368.11 |
| 5,111,110 * | 5/1992 | Houben .................................. 315/10 |
| 5,216,504 * | 6/1993 | Webb et al. ......................... 348/190 |
| 5,304,809 * | 4/1994 | Wickersheim ................... 250/458.1 |
| 5,334,911 * | 8/1994 | Emmoto ................................. 315/10 |
| 5,371,537 | 12/1994 | Bohan et al. . |
| 5,440,340 * | 8/1995 | Tsurutani et al. .................... 348/190 |
| 5,442,391 * | 8/1995 | Hung et al. .......................... 348/190 |
| 5,510,833 * | 4/1996 | Webb et al. ......................... 348/190 |
| 5,523,782 * | 6/1996 | Williams ............................... 348/66 |
| 5,536,192 * | 7/1996 | Byun ....................................... 445/3 |
| 5,638,461 * | 6/1997 | Fridge .................................. 382/141 |
| 5,742,338 * | 4/1998 | Nose .................................... 340/566 |
| 5,745,168 * | 4/1998 | Ninomiya ............................. 348/191 |
| 5,771,067 * | 6/1998 | Williams et al. ...................... 348/66 |

* cited by examiner

TEST AND ALIGNMENT SYSTEM FOR ELECTRONIC DISPLAY DEVICES

CROSS REFERENCE TO RELATED APPLICATIONS

This application is a continuation-in-part of U.S. application Ser. No. 08/259,309, filed Jun. 13, 1994.

FIELD OF THE INVENTION

This invention relates to the field of aligning and inspecting electronic display products including cathode ray tube (CRT) assemblies for computer monitors and television sets. More particularly, the invention relates to an aligning and inspection system for CRTs which can perform a comprehensive series of required tests at one station while simultaneously displaying the test results in a graphical user interface. The invention also relates to a digital color Charged Couple Device (CCD) camera device and a high sensitivity photodiode array device.

BACKGROUND OF THE INVENTION

In adjusting cathode ray tube (CRT) assemblies for computer monitors and television sets, precise mechanical, optical and electronic adjustments are required to provide optimum reproduction image quality. These adjustments include, but are not limited to, focus, purity of color, convergence of beams, color uniformity, geometry, and luminance. Each of these adjustments are typically performed independently from each other by a trained technician with the aid of a testing system. However, the testing systems previously used were deficient because they were unable to perform all of the tests needed to precisely align a CRT, were very slow and unable to provide real-time feedback for operator adjustments, were not sufficiently accurate and were not integrated to perform each of the measurements in an optimized sequence and then recheck and readjust measurements as required.

OBJECTS AND SUMMARY OF THE INVENTION

It is an object of the present invention to provide a system and method for testing and aligning electronic display devices to obviate the problems and limitations of the prior art systems.

It is a further object of the present invention to provide an improved system and method for testing and aligning electronic display devices which allows for quick and easy mounting and dismounting of a CRT for test and/or alignment onto a test fixture.

Yet another object of the present invention is to provide an improved system and method for testing and aligning electronic display devices which can perform all of the tests needed to precisely align a CRT assembly and provide real-time feedback for operator adjustments.

Still another object of the present invention is to provide an improved system and method for testing and aligning electronic display devices which can integrate each of the measurements and make readjustments for measurements previously performed as required.

An additional object of the present invention is to provide an improved color CCD camera which can maintain focus irrespective of variations in the thickness and glass curvature of the CRT screen.

In accordance with the invention, there is provided a system for testing and aligning a CRT assembly. The system includes a video pattern generator connected to the CRT assembly for generating images of video test patterns on the CRT assembly. A plurality of optical sensor devices are mounted in a test fixture facing the CRT for sensing and producing image signals corresponding to the image of the video pattern on the CRT assembly. The system includes a circuit to synchronize and multiplex the image signals, to generate a digital signal and to test and align the CRT assembly in response to the digital signal. In addition, the system provides for automatic adjustment of the test fixture and the optical sensor devices mounted thereon to match the specifications of a specific geometry of CRT assembly being tested. The system also includes one or more wobulator devices generating an alternating magnetic field to assist in determining and adjusting the position of beam landing. The wobulator devices are mounted in close proximity with the front face of the CRT under test within the test fixture and are positioned to affect the screen area monitored by the optical sensor devices.

In further description of the invention, the terminology CRT or CRT assembly includes all means required to produce an image on a CRT, such as, but not limited to, the following elements: circuitry for generating electron beam (s), deflection elements and circuitry for horizontal and vertical scanning of electron beams(s), elements and circuitry to modify the relative position of electron beams and their position in relation to the mask or matrix of the CRT and elements and circuitry for focusing the electron beam(s).

According to the invention, one of the optical sensor devices includes a plurality of color CCD camera heads and first devices such as a motor in each color head to automatically focus the color CCD camera heads located on the test fixture with respect to the light-emitting surface of the CRT assembly. Further, second devices such as a motor in or adjacent to each color head are provided to individually position each of the color CCD camera heads on the test fixture with respect to the CRT assembly to match the specifications of a specific model of CRT being tested. Both the first and second devices are controlled by circuitry incorporating multiplexing and motor control functions.

According to the invention, the optical sensor devices include photodiode devices adapted for sensing the red, green or blue light emitted by the respective phosphors of the CRT, and utilized for measuring color purity and luminance. The photodiode devices may be secured to the color CCD camera heads, or applied independently, in conjunction with or without wobulator devices.

According to the invention a method of testing and aligning a CRT assembly comprises the first step of presenting a CRT assembly to an alignment system, and any or all further steps of: adjusting the focus of the CRT to meet focus specifications; adjusting the yoke of the CRT to meet at least preset Color Purity, Vertical Raster Shift and Yoke Rotation Test specifications; adjusting the CRT to meet Static Convergence Test specifications; adjusting the CRT to meet Dynamic Convergence Test specifications, and adjusting the CRT to meet various Image Geometry Test specifications, such as horizontal and vertical size and position, orthogonality and distortion. The method further includes the steps of: rechecking each of the CRT adjustments to insure that the CRT meets each of the specifications; and rejecting the CRT whenever one or more of the test specifications is not met.

According to the invention a color CCD camera is constructed of a lens, a CCD chip, and a motorized system for moving the CCD chip with respect to the lens to focus the CCD camera. The color CCD camera further includes a first motor mounted to the camera for moving the CCD chip with respect to the lens, structure for mounting the camera to a test rack, and a second motor for moving the camera with respect to the test rack. The second motor may be an integral part of the structure for mounting the camera to a test rack.

Further in accordance with the invention, a photodiode device adapted for measuring color purity and luminance comprises one to three photodiodes for sensing light intensity, one to three separate band pass optical filters, (one for red, one for green and one for blue) each located in front of one of the photodiodes, and one to three separate lenses that collect light. Each of the separate lenses is disposed in front of one of the optical filters for directing light from the selected area of the CRT through the respective optical filter onto a corresponding diode. Also, the photodiode device includes structure for mounting the photodiode device to the test rack and structure for moving the photodiode device with respect to the test rack. The structure for moving the photodiode device may be the same as the structure moving the CCD camera, if the photodiode device is mounted onto the CCD camera.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
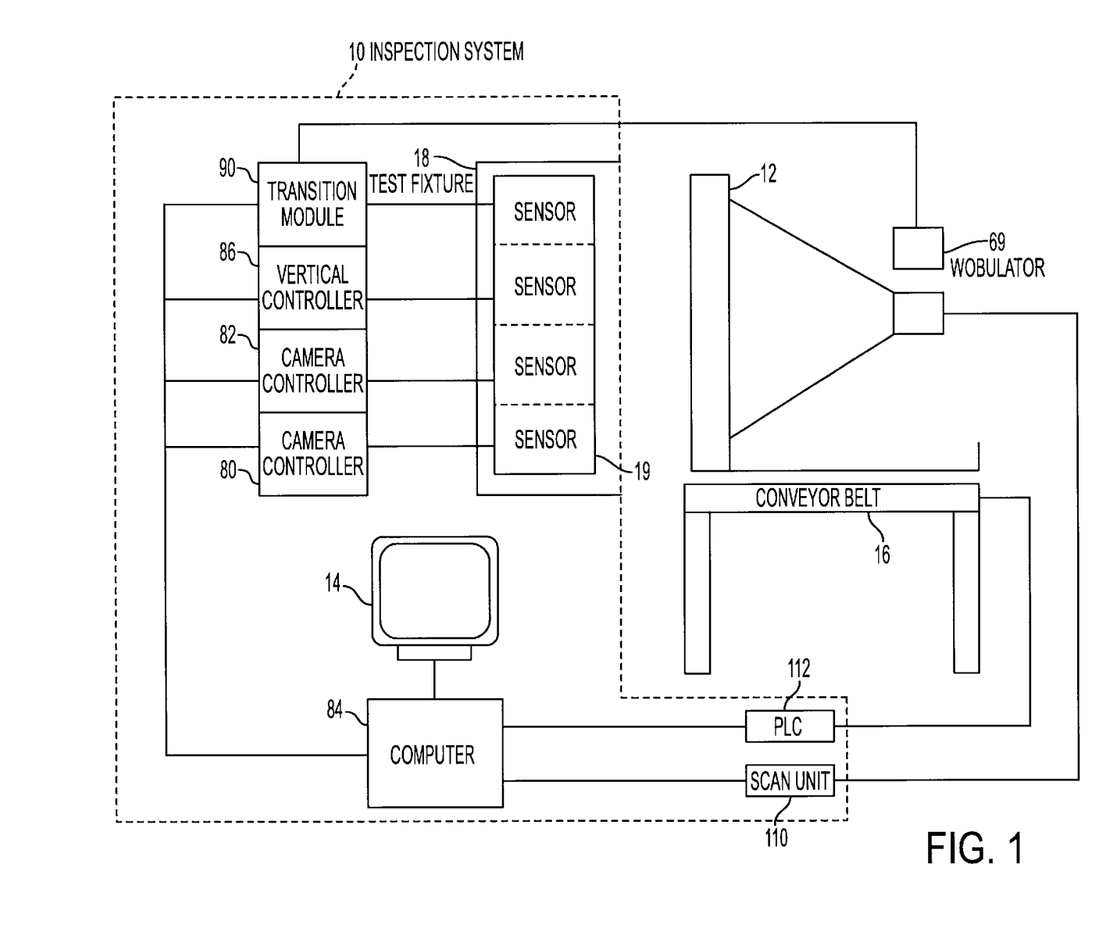
FIG. 1 is a block diagram of a system for testing and aligning a CRT assembly in accordance with the present invention.

Referring to FIG. 1 of the drawings, there is shown a schematic illustration of an inspection system 10 for inspecting, testing, and aligning electronic display devices 12 including CRT assemblies and television sets or computer monitors containing CRT assemblies, in accordance with the present invention. System 10 consists of a test fixture 18 containing a plurality of sensor devices 19, one or more multi-channel camera-head controller(s) 80 and 82, a multi-channel vertical motor controller 86, one or more purity/luminance transition module(s) 90 and a computer 84 connected to the operator display 14. Computer 84 is also connected to a scan unit 110 facilitating the operation of CRT 12 and more specifically controlling the patterns displayed by CRT 12. Computer 84 can also be connected to a programmable logic controller (PLC) 112 directing the movement of the CRT assemblies 12 on a conventional conveyor belt 16. Computer 84 is equipped with special-purpose modules to perform specific and non-standard functions associated with the generation of test patterns and processing of sensor signals, that are described in more detail in conjunction with FIG. 4 below. A special wobulator device 69 is also shown in FIG. 1, with further explanation of its function provided below in conjunction with the description FIG. 2.

System 10 performs a comprehensive series of tests and alignment functions that are used in manufacturing these types of displays. The test and alignment functions include: color purity, focus, static and dynamic convergence, yoke rotation, perpendicularity or orthogonality, video pattern size and centering, raster size and centering, linearity, geometry, and luminance measurements including brightness cut-off. While each of these tests and alignment functions can be implemented at a single station, system 10 has a modular design and can be constructed in different configurations. It is also within the terms of the invention to implement any combination of the tests and functions simultaneously at a single station.

System 10 has semi-automatic test sequence control which guides an operator who is performing the adjustments on a CRT assembly to progress through the alignment process with a graphical user interface. The test sequence control is essentially a series of video-displayed gauges and other graphical indicators implemented in the program contained in computer 84 and displayed on the screen of an operator display 14. The graphical user interface portion of the system software incorporates video-displayed gauges, each of which can include a color coded indicator or symbol, such as an arrow, a needle, or a circular spot or ball that is located in a window with optional cross-hairs. Alternately, it can be a linear video-display gauge. As the operator adjusts a particular control on a monitor or CRT 12 being aligned, the gauge moves on the screen of display 14. When the measured parameter is out of the specified limits, frame of the respective indicator or the indicator itself is red in color. However, when the operator adjusts the CRT and the indicator parameter enters within the specified limits, the frame or the indicator itself changes and is green in color. The green color indicates to the operator that the CRT 12 has passed a specific test. Only after a test has been successfully completed will the software allow the operator to proceed to the next test. Thus, the system 10 removes operator subjectivity from the alignment process because it will not allow the operator to pass the CRT onto the next test or alignment procedure. At the same time, system 10 may print a "pass" or "fail" label with printer 94 for each display being tested. Importantly, whenever the CRT 12 fails a test performed by the system 10, not only will "fail" be displayed and/or printed, but the CRT 12 will not be allowed to continue moving down the production line and will be automatically rejected from conveyor system 16 which moves the CRT displays 12 through the system 10. In some cases, system 10 can even be integrated with the conveyor system 16 of the production line and re-route or reject a failed CRT 12 from the line.

Another important feature of system 10 is the short response time, typically between about 0.20 seconds to about 0.33 seconds, with which the test and alignment results are displayed on the operator display 14. As the response is nearly real time, the indicators move almost simultaneously with the operator adjusting the controls on the CRT assembly 12.

Figure 2:
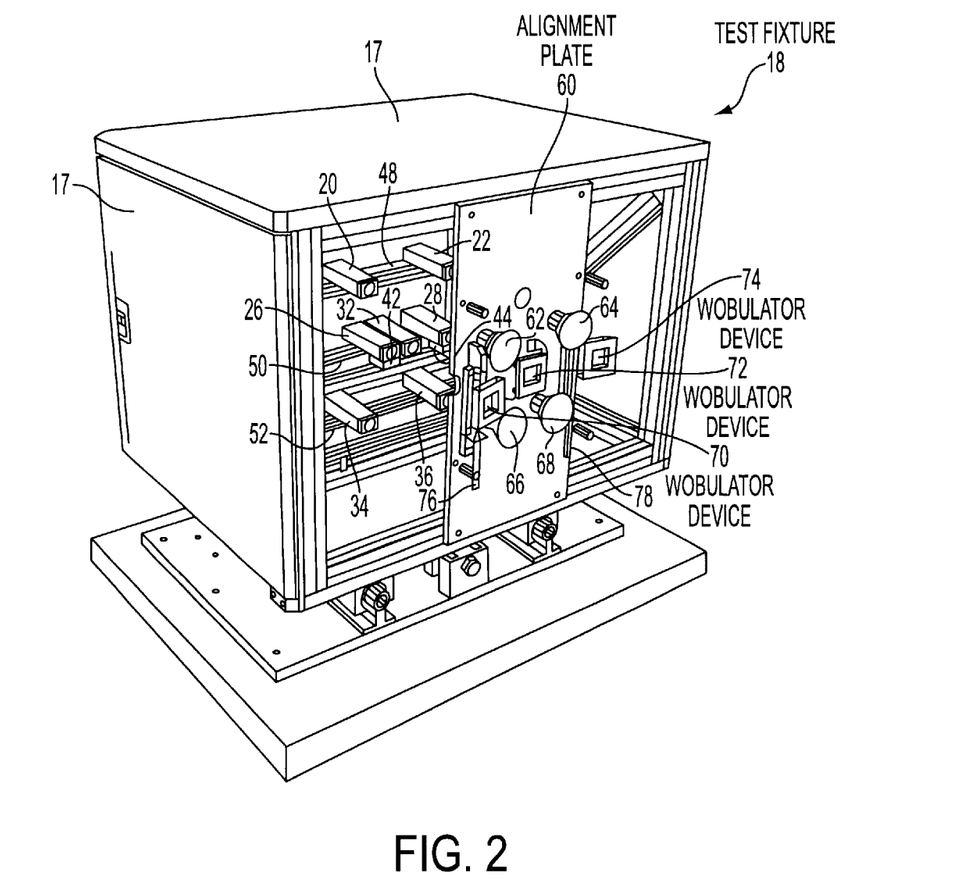
FIG. 2 is a perspective view of a test fixture to which a CRT is secured for testing and alignment in accordance with the invention.
Figure 3:
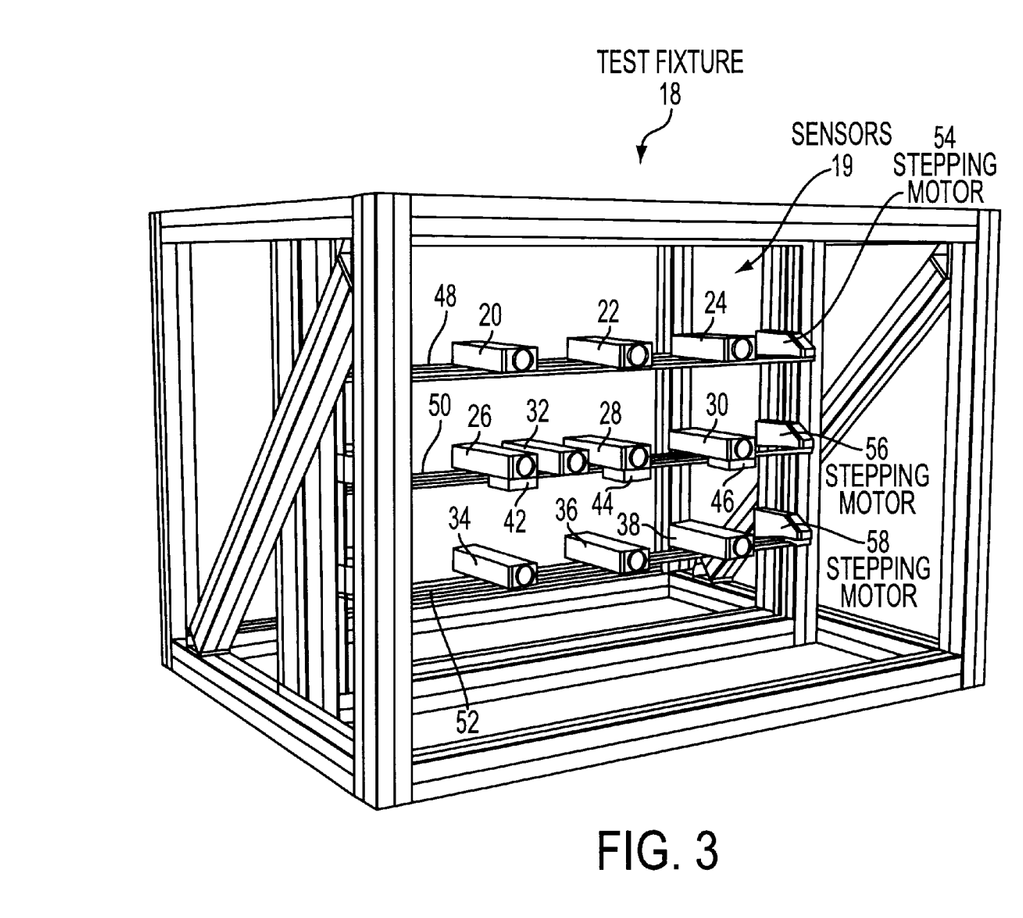
FIG. 3 is a perspective view of the test fixture in FIG. 2 with the CRT support plate and fixture base removed.

Referring to FIGS. 2 and 3, there is shown a perspective view of the preferred embodiment of the test fixture 18. FIG. 3 illustrates the details of fixture 18 with cover 17 removed. The test fixture 18 which houses the sensor devices 19 including a plurality of digital color CCD camera devices 20,22,24,26,28,30,32,34,36,38 (20–38) and a plurality of high sensitivity photodiode devices 42,44,46 (42–46), can be covered by enclosure or cover 17 as shown in FIG. 2. The sensor devices 19 with independent fields of view are adjustably mounted in an array on movable supports 48, 50, and 52 (48–52) within test fixture 18. Each of the supports 48–52 can be independently moved in a vertical direction to position the sensor devices 19 mounted thereon as required. Preferably, the supports 48–52 are driven by conventional servo-motors or stepping motors 54,56,58 (54–58), respectively. Each color camera device 20–38 can be moved horizontally from side to side on supports 48–52. A unique aspect of the invention, described in more detail below, is the provision of a motor in each camera device 20–38 to independently control the movement of the camera device in the horizontal direction. while sensors 19 include two different types of sensors, i.e. digital color CCD camera devices 20–38 high sensitivity photodiode devices 42–46, it is within the terms of the invention to mount anywhere from one (1) to one hundred and twenty eight (128) sensors 19, including any type of sensor as needed, on any number of supports. Another important aspect of the invention is that each CCD camera type device 20–38 is electronically controlled to be automatically focused under control of computer 84, as discussed below.

A significant advantage of the system 10 is its ability to reposition the sensors 19 in accordance with the specifications of various models of CRTs under program control. For example, if a manufacturer has several different models and/or sizes of CRTs, the specifications for each can be stored within the computer 84. Typical CRT assemblies can vary in size between about 12 inches and 50 inches. When the operator needs to change from testing a 20 inch CRT to a 29 inch CRT, the new 29 inch model is simply selected from the software menu and system 10 automatically readjusts the positions of sensors 19 and selects the required tests with the respective test limits to perform the appropriate measurements. That is, movable supports 46–50 within test fixture 18 are moved to a predetermined location by their motors 54,56,58, respectively, and each sensor 19 is automatically moved from side to side to the proper location for the model CRT being aligned and tested. Then, each CCD camera type sensor 20–38 is automatically focused. All of the required instructions for each specific model CRT are stored in the system program storage medium, for example a hard drive (not shown), associated with computer 84.

As shown in the illustration of a preferred embodiment in FIG. 2, an alignment plate 60 is secured to the front of the test fixture 18. Four rubber suction cups 62,64,66,68 (62–68) are secured to plate 60 and project outward therefrom. The alignment plate 60 also has a plurality of wobulator devices 70,72,74 (70–74) pivotally mounted thereon that are used in the measurement of color purity as discussed in more detail below. Each of the wobulator devices 70–74 has at least one, or preferably one pair of precisely wound coils of wire which is enclosed in a rectangular housing having a rectangular opening through the center thereof. The opening allows the photo sensors 19 to sense the light emanating from the CRT display. For situations when it is desirable to remove the wobulator devices 70–74, components such as pneumatic cylinders 76 and 78 are provided to move the wobulator devices 70–74 out of the way of sensors 19 and to provide an unobstructed view whenever necessary. While it is preferable to place any number of wobulator coils between the CRT display and the sensors 19, it is also within the terms of the invention to provide a special wobulator device 69 (as shown in FIG. 1) and to position the wobulator coil of device 69 adjacent to the neck of the CRT containing the electron guns. Then, the wobulator coil can be powered with a known amount of current to generate electromagnetic fields that bend the electron beams so that the effect of them landing at modified positions can be measured.

Typically, the conveyor 16 delivers a CRT 12 to the test fixture 18. The screen of CRT 12 is then secured to the suction cups 62–68 on alignment plate 60 so that it is firmly mounted and does not move during the test and alignment procedures. Once the test and alignment procedures are concluded, the CRT is removed from the cups 62–68 and moved to another station (not shown) for further processing as needed.

As discussed above, a unique aspect of the invention relates to the specific sensors 19 that are used in system 10. Sensors 19 include camera sensors 20–38 which are color CCD cameras instead of monochrome cameras typically used in the prior art systems. The problem with monochrome cameras is the longer time required to perform color conversion measurements. For example, to determine the position of the red, green, and blue stripes in a color monitor, a red pattern, a green pattern and then a blue pattern are sequentially acquired. This is a slower, less accurate process then using a color camera which neither requires any conversion measurements nor requires the patterns to be displayed more than once. While color cameras are commercially available, their cost is high.

Figure 4:
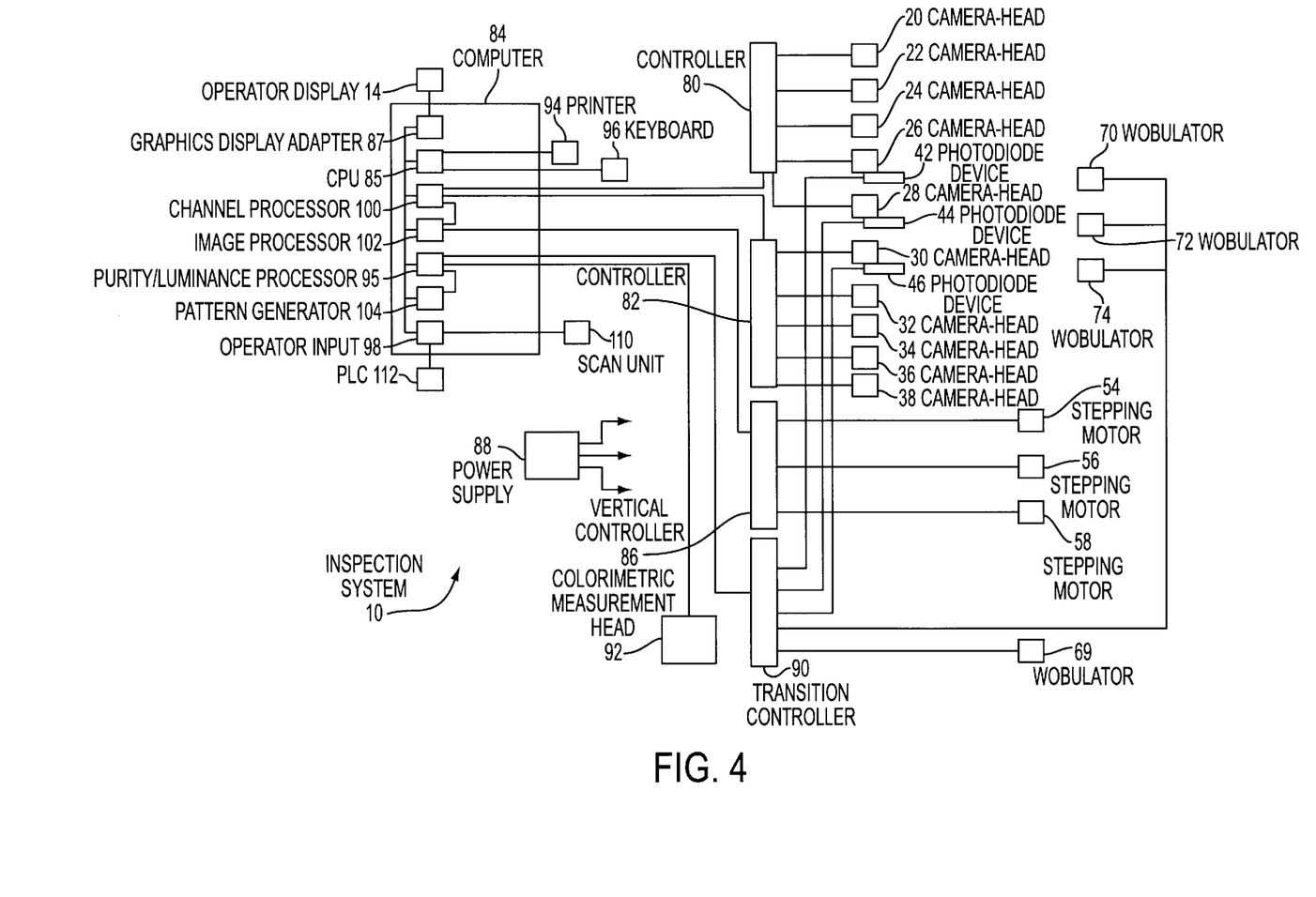
FIG. 4 is a block diagram of the interconnection of the components of the system for testing and aligning CRT assemblies.

In the preferred embodiment, special purpose color cameras were incorporated into the system 10. FIG. 4 shows a block diagram of the system 10. The digital color CCD cameras 20–38 of the present invention are commonly called camera heads. Each camera head 20–38 is equipped with a lens, such as a TAMRON 50 MM lens, available from the Tamron Corp. of Japan, a CCD image sensing chip and associated electronics. A number of camera heads 20–38 are connected to camera head controllers 80 and 82. One special feature of the color CCD cameras 20–38 is the auto focus feature which incorporates electronic control to insure that the camera is always in focus. The construction of the camera is further described in conjunction with FIG. 12. The advantage of the camera heads 20–38 is their ability to maintain accurate focus and eliminate problems caused by CRT glass thickness and curvature variations. The camera heads 20–38 have digital video signal output which allows straightforward multiplexing of the output of many cameras while offering exceptional immunity to electrical noise.

In operation, the video pattern generator 104 (see FIG. 4) generates a test pattern via the scan unit 110 on the CRT 12, and the camera heads 20–38 sense the image on the screen of the CRT being tested. The computer 84 determines whether or not the CRT is in focus and adjusts the focus when needed as described above. The software incorporated in the computer system 84 to analyze focus is typical Image Analysis Software.

Referring again to FIG. 4, an eight (8) channel, high speed digital multiplexer, provided in camera head controllers 80 and 82, controls and routes digital information from the camera heads 20–38 to a video input channel processor 100. This enables up to eight camera heads 20–38 to be multiplexed into one camera controller 80,82 which is typically located in the test fixture 18. Since the system 10 has a modular design, several groups of up to 8 cameras each can be incorporated in the design, each group having a camera head controller, such as 80 and 82, i.e. 24 cameras and 3 camera head control units.

A vertical motor controller 86 is also provided. Typically controller 86 is mounted on test fixture 18 for controlling the vertical motors 54–58 to position movable supports 48–52 as needed. Vertical motor controller 86 is connected to computer 84 and is powered by power supply 88, which also supplies the required operating voltages to the other modules in fixture 18.

Wobulator device 69 and/or 70, 72 and 74 inputs are driven by the purity/luminance transition controller 90 which in turn is interfaced with computer 84. The controller 90 is also connected to photodiode arrays 42–46 which are used to measure luminance, and in conjunction with the wobulator devices, for beam landing (color purity) measurements. The electrical signals generated by the high sensitivity photodiode devices 42–46, in response to the light emitted by the CRT, are processed by the purity/luminance processor 95, located in the computer 84. High precision color measurement can be accomplished by the calorimetric measurement head 92, connected to the purity/luminance processor 95. The calorimetric measurement head 92, in its preferred embodiment, contains four silicon photodiodes with precisely manufactured and calibrated optical filters, in compliance with internationally recognized standards for color measurement, such as the C.I.E. chromaticity system.

The video signal of the CCD cameras 20–38 is channeled through the camera head control unit 80,82 and following multiplexing, transferred to a video input channel processor 100 in the computer 84. The high speed video input channel processor 100 processes camera signals "on-the-fly" at real time, typically at 30 frames per second. The video input channel processor 100 performs a variety of fundamental image processing operations including thresholding, interpolation, color space conversion, as well as horizontal and vertical projections. The video input channel processor 100 also controls the color CCD camera heads 20–38 and interprets the digital output coming from the camera heads via the camera head controller 80,82 to generate a video input channel processor signal. This processor signal is then directed into a color space converter within the input channel processor 100 which converts it from luminance and chrominance values to red, green and blue values for processing by the secondary image processor 102 and finally interpreted by the CPU 85 in computer 84.

A significant advancement of system 10 is its ability to perform measurement by a plurality of sensor devices 19 at the same location of the CRT image, and process the signals simultaneously from the different sensor devices. This is apparent, when color purity, vertical raster shift and image rotation can all be measured and displayed at the same time, as all these parameters are dependent upon the alignment and position of the same electromagnetic elements of CRT assembly 12. For convergence measurements, the individual dots of color on the CRT cannot be analyzed by themselves for two reasons. The color dots on a CRT are not perfectly round but typically have very odd shapes, and due to the large cross-section of the electron beam, a group of dots are illuminated. To compensate for irregularity in beam shape, a group of dots for each color are analyzed and the relative position of the centers of their masses are calculated mathematically. By analyzing the projection, the irregular beam shapes can be compensated for to provide a more accurate measurement.

Another important alignment step relates to focusing the electron beam. There is no perfect analytical evaluation for what humans perceive as good focus. For example, with 2 small spots on the screen, one twice as big as the other and the smaller one twice as bright as the big one, both will appear to be the same size. Accordingly, to measure focus, a combination technique in software is used involving first measuring line width for the spot size and then measuring the depth of contrast which is MPF. By determining the center of the mass and measuring the spot size at the center of the depth of contrast, the dot correlates very well to the human eye's perception of good focus. These calculations are performed by the secondary image processor 102.

A principle feature of the invention relates to the programmable video pattern generator 104. The pattern generator 104, in conjunction with the secondary processor 102, provides dynamic pattern tracking capability so that the video test pattern can be kept within the field of view regardless of adjustment affecting the image on CRT 12 or deflection yoke quality.

The software program running on computer 84 includes an engineering menu which is a software menu system that allows the technicians and operators who adjust the test equipment in CRT and monitor manufacturing plants to select options via a keyboard to change a wide variety of system parameters. For example, the specifications of a new display can be entered and the requirements, such as the pass-fail limits for a display being manufactured, can be changed. Also the test sequence, the graphical user interface displayed by operator display 14 via graphics display adapter 87, and the video test pattern parameters can easily be modified. It can be set up to also test and calibrate different system components with an auto-calibration procedure that allows the technician to simply select calibration routines from the menu which cause the system to automatically calibrate the sensor devices.

Another important feature of the invention is the ability of system 10 to automatically change configuration from one CRT display to another. The changeover time is typically in the order of seconds and less than about a minute depending on the physical difference in displays being tested. By contrast, most of the prior art systems require a manual change over. That is, when display sizes are changed, the technician must manually move the sensors around. This is both time consuming and inaccurate as compared to the present system 10 as described herein.

Another feature of the invention relates to the speed for making the measurements. The maximum time to make a single measurement is in the order of 30 milliseconds. Since system 10 has a parallel processing architecture, a number of measurements can be made simultaneously in that same 30 milliseconds. In other words, a large number of measurements are performed simultaneously and because of the modular architecture of system 10, it doesn't matter how many measurements are needed. For example, measurements by 8 sensor devices 19 can be made just as fast as by 4 sensor devices.

Figure 5:
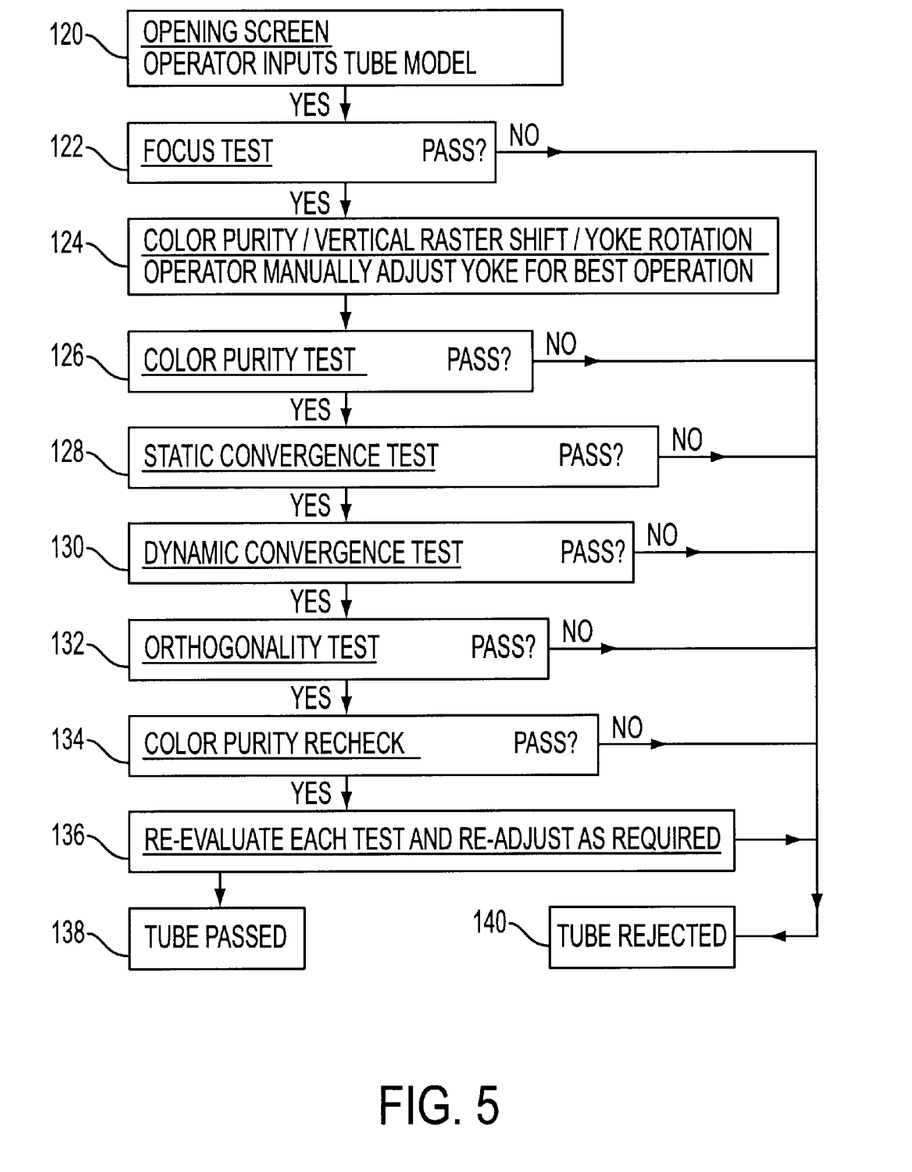
FIG. 5 is a flow diagram illustrating the test and alignment sequence of a CRT assembly.

To better understand the system 10, a discussion of a preferred test procedure with reference to the Flow diagram of FIG. 5 and the operator displays shown in FIGS. 6–11 follows.

System Start-Up

After applying power to the system 10, it will be ready to begin operation and the "Opening Screen" panel 120 will be displayed on the operator monitor 14. The system 10 is now "Waiting For A Command" from the PLC 112 to proceed and/or from an operator via traditional computer data input means, such as a keyboard 96 or a control module (not shown).

Test and Alignment Sequence

Upon receipt of a command from PLC 112 or from operator input to begin operation, the scan unit 110 will automatically initiate all operating voltages to the CRT 12 and start the test sequence, typically with focus 122.

Focus

Figure 6:
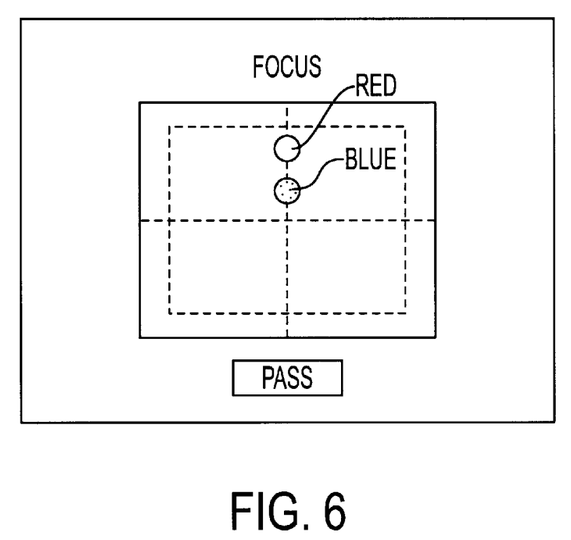
FIG. 6 is a diagram illustrating the operator screen panel for static focus adjustment.

System 10 measures the focus and adjusts the CRT focusing voltage, or the operator may adjust it if automatic control is not possible. The user interface panel displays a graphical readout as well as a "PASS" or "FAIL" readout, as shown in FIG. 6. CRT assembly under test is focused within the specified limits when the red "ball" is located within the dotted rectangle. The closer the red "ball" is to the center of the crosshairs the better the focus is. If the tube is passed, the system will automatically progress to display the "Color Purity/Vertical Raster Shift/Yoke Rotation" panel at step 124.

Color Purity/Vertical Raster Shift/Yoke Rotation

Figure 7:
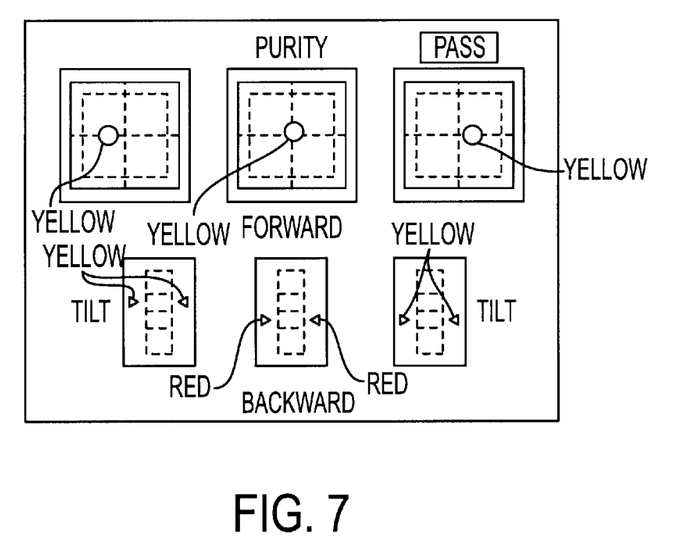
FIG. 7 is a diagram illustrating the operator screen panel for adjustment of color purity.

The "Color Purity/Vertical Raster Shift/Yoke Rotation" panel, as shown in FIG. 7, displays several video meters which indicate adjustments to the yoke and two purity rings. As the operator moves the yoke backward and forward, the "balls" in both of the upper, outside square-boxed meters move from the outside towards the center of the screen and back and the lower middle meter pointers move up and down. Rotation of the yoke will register in both of the lower outside "Tilt" meters. Movement of the two purity rings will register in all three of the upper meters. As well, the upper middle meter will indicate vertical raster shift related to the top to bottom position of the indicator "ball". The screen will display a "PASS" or "FAIL" readout dependent on whether or not the adjustment specifications have been met. A unit which is unable to be adjusted to "PASS" is rejected, and the system will automatically start over with a new tube. Once a "PASS" has been attained, the system will wait for the operator at step 126 to manually signal the PLC 112 to proceed to the Static Convergence test at step 128.

Static Convergence

Figure 8:
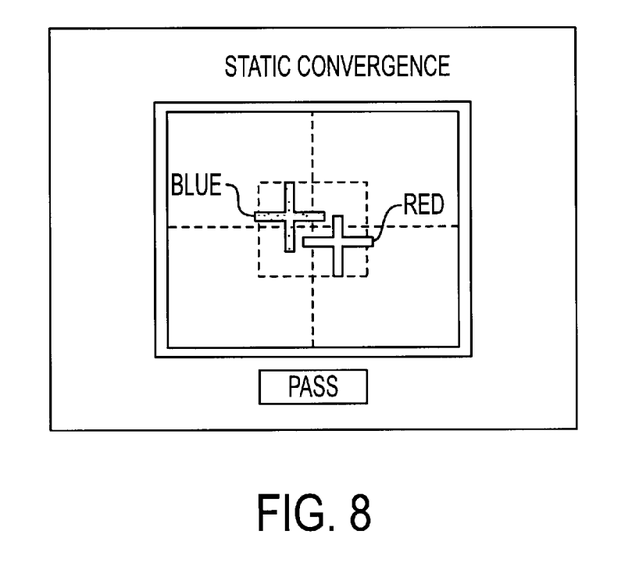
FIG. 8 is a diagram illustrating the operator screen panel for adjustment of static convergence.

The Static Convergence panel, as shown in FIG. 8, registers adjustments to the magnetic correction device of a CRT assembly, traditionally two pairs of yoke rings known as the four pole ring magnets and the six pole ring magnets. The operator adjusts the two pairs of yoke rings to bring the red and blue crosses as close to the center of the crosshairs as possible. The static convergence of the CRT assembly under test, as an example, is acceptable when the red and blue crosses are adjusted so that they are located within the dotted rectangle and no further than half of the width of the dotted rectangle apart. Once a "PASS" readout is achieved, the operator can proceed to the Dynamic Convergence test at step 130. If a "PASS" readout cannot be attained, the operator should reject the tube and begin the test sequence over again with a new tube.

Dynamic Convergence

Figure 9:
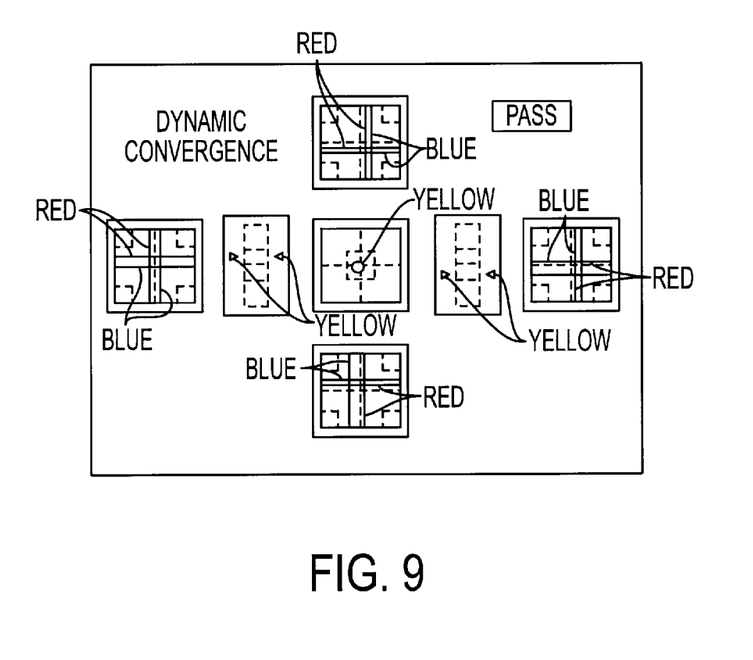
FIG. 9 is a diagram illustrating the operator screen panel for adjustment of dynamic convergence.

The Dynamic Convergence panel, as shown in FIG. 9, registers convergence as typically measured at four or more locations on the CRT under test. These four locations in the example are along the horizontal and vertical axes of the tube, near to the edge of the active display area. A combined result is displayed in the center meter. If the "ball" is within the dotted rectangle, the four convergence measurements are within the specified limits. Yoke tilt is also displayed. If both Yoke tilt and measured convergence are within specified limits, a "PASS" result is obtained. Once a "PASS" readout is achieved, the operator can proceed to the Orthogonality test, at step 132. If a "PASS" readout cannot be attained, the operator should reject the CRT assembly and begin the test sequence over again with a new tube.

Orthogonality

Figure 10:
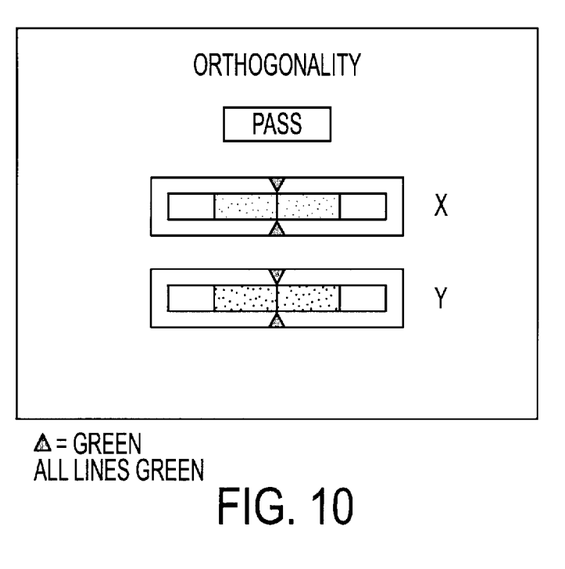
FIG. 10 is a diagram illustrating the operator screen panel for adjustment of orthogonality.

The system 10 automatically tests the orthogonality of the horizontal and vertical windings of the deflection yoke and displays an "X" and "Y" gauge as well as a "PASS" or "FAIL" readout, as shown in FIG. 10. If the yoke is passed, the system will automatically progress to display the "Color Purity Recheck" panel, at step 134. If a "PASS" readout is not attained, the operator should reject the CRT assembly and begin the test sequence over again with a new tube.

Color Purity Recheck

Figure 11:
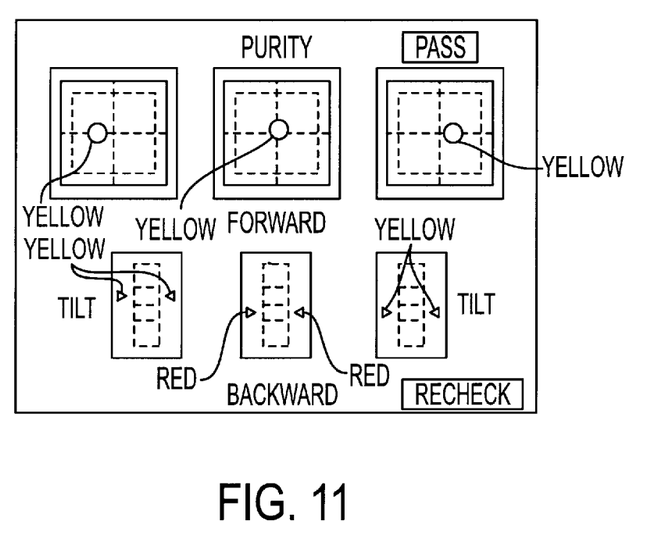
FIG. 11 is a diagram illustrating the operator screen panel for rechecking color purity.

The Color Purity Recheck test at step 134 is a repeat of the Color Purity/Vertical Raster Shift/Yoke Rotation test to ensure that the measured parameters have remained in a "PASS" condition. The operator screen, as shown in FIG. 11, will display a "PASS" or "FAIL" readout, based on the measured values.

If required, the system 10 will re-evaluate each test and allow the operator to re-adjust any parameters at step 136. At the conclusion of the sequence, the CRT assembly 12 would be either passed at step 138 or rejected at step 140.

Another important aspect of the invention relates to the construction of cameras 20–38 used in the preferred embodiment. Since all of the cameras 20–38 are generally of the same construction, only the details of camera 20 are described and shown in FIG. 12. Camera 20 includes a housing 148 closed at one end and having a lens 152 mounted in an opposite end. A CCD chip 150 is disposed behind the lens 152 at a desired distance so that the image of a certain detail generated on the screen of CRT is in focus when it strikes the CCD chip. The CCD chip 150 is mounted on a slidinq assembly 154, which is able to reciprocate in a linear direction parallel to the optical axis 156 through lens 152. The sliding assembly 154 is abutted against and guided by a linear slide element 158, and is driven by a first motor 160 via a drive device 162, such as a lead-screw assembly. In operation, the first motor 160 is driven by computer 84, to turn screw assembly 162 so that the CCD chip 150 is moved to a location in relation to the lens 152 so that the image reflected from CRT and projected onto CCD chip 150 by lens 152 is sharp and in focus.

Figure 12:
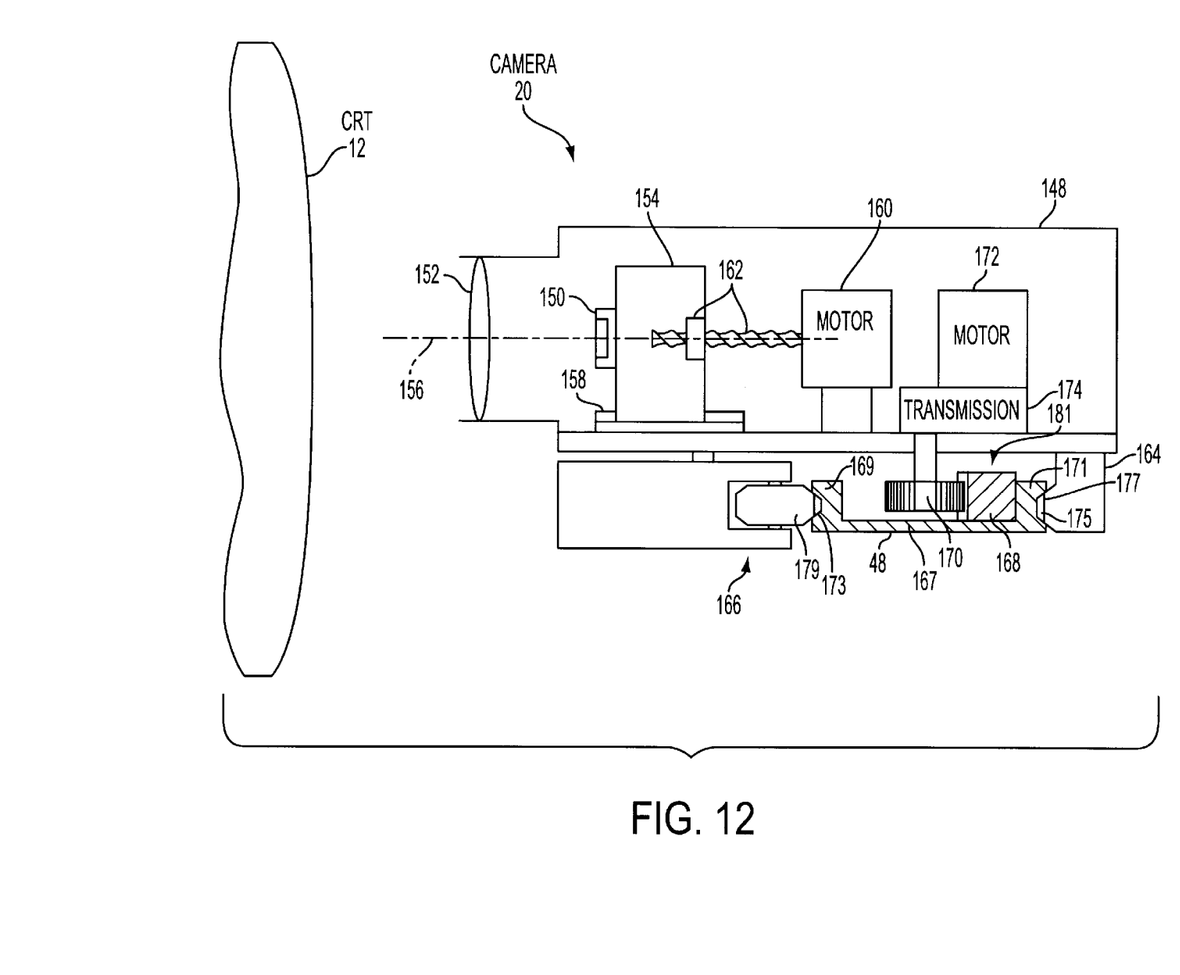
FIG. 12 is a simplified illustration of the cross-section of the CCD camera used in the system of the present invention.

The camera 20 is mounted onto the movable support 48, or any other movable support, such as movable supports 50 or 52, with a linear guiding device 164 and a positioning device 166. Movable support 48 has a base 167 with two side walls 169 and 171 projecting upward therefrom. Each of the side walls 169 and 171 have a slot 173 and 175, respectively, which engage linearly extending guide 177 and rotating guide 179 which extend inward from positioning device 166 and linear guiding device 164, respectively, and are in facing relation to each other. Support 48 is equipped with a rack 168, which in turn is connected to a connecting gear 170, to form a rack-and-pinion linear drive arrangement 181. The gear 170 is driven by second motor 172 via a transmission 174 which moves the camera in a transverse direction perpendicular to optical axis 156 along the movable support 48 so that camera 20 is positioned at the required measurement location within fixture 18.

Figure 13:
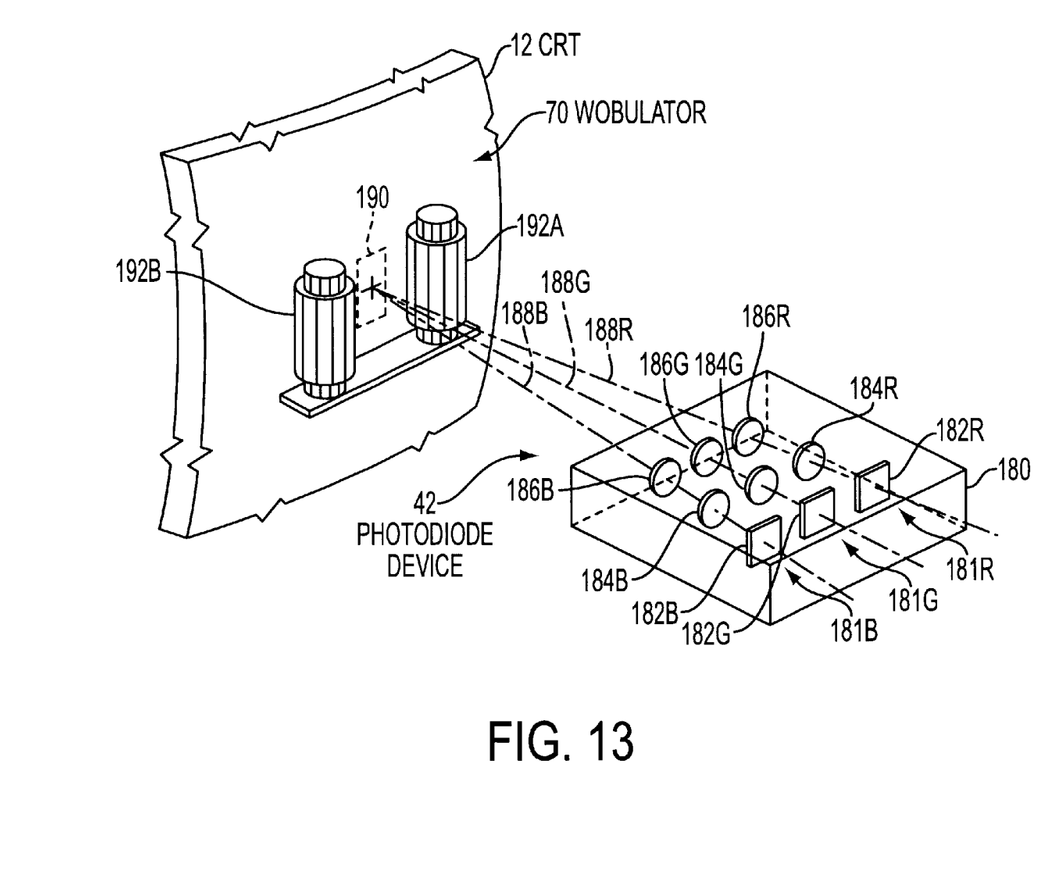
FIG. 13 is a simplified drawing of the photodiode device and wobulator assembly adapted for color purity measurement.

The photodiode device 42, or any one of the other photodiode devices 44, 46, is shown together with some details of the wobulator assembly 70 in FIG. 13. For ease of visualization, the photodiode device 42 is shown schematically with a photodiode housing 180 appearing transparent and nonessential elements of the wobulator assembly 70 not shown. Moreover, the circuitry connecting the photodiode device and the wobulator assembly is not illustrated in FIG. 13.

A plurality of photodiode sensors 181R, 181G, 181B (181R–181B) each include photodiodes 182R, 182G, 182B (182R–182B), respectively, located behind optical filters 184R, 184G, 184B, (184R–184B), respectively, which in turn are disposed behind lenses 186R, 186G, 186B (186R–186B), respectively. Each of the photodiode sensors (181R–181B) is coaxially located along one of the optical axes 188R, 188G, 188B (188R–188B), respectively. The three optical axes 188R–188B intersect at the approximate center of area 190 on CRT 12. The focal length of each of the lenses 186R–186B is selected such that when the lenses are positioned at a preselected distance to the CRT 12, the image of area 190 (typically an area of about 1 inch by 1 inch) is projected onto its respective photodiode 182R–182B. The narrow optical transmission wavelength range of the optical filters 184R–184B matches the emission bands of the phosphors utilized in CRT 12 such that filter 184R transmits part of the light emitted by the red phosphor, 184G transmits part of the light emitted by the green phosphor, and filter 184B transmits part of the light emitted by the blue phosphor. While FIG. 13 illustrates a photodiode device 42 comprising three optical groups for sensing red, green and blue light emissions, in most applications of color purity alignment, any one, typically the green light measurement is sufficient. Thus, for many applications, a single-channel photodiode device consisting of the elements designated by the letter G following the respective numbers is adequate. The photodiode devices 42,44,and 46 are typically mounted to a camera head 26,28, or 30, respectively, as shown in FIG. 3. In that case, the photodiode devices are positioned on the movable support 48, or any other movable support, such as movable supports 50 or 52, by the linear guiding device 164 and the positioning device 166 used to position camera head 26,28, or 30. It is also within the terms of the invention to mount the photodiode devices directly onto the movable support and to position each photodiode device independently of a camera head by means such as the linear guiding device 164 and the positioning device 166.

The wobulator assembly 70, or the similarly constructed wobulator assemblies 72 and 74, consist of at least one, but typically one pair of wobulator inductor coils 192A,192B, disposed adjacent to the face of CRT 12, and symmetrical to the test area 190. The pair of inductor coils 192A,1923 are simultaneously energized by an alternating polarity current. Each half cycle of the current is maintained for at least one period, or a multiple of the periods of the full vertical scanning time of CRT 12. The vertical magnetic field generated thereby results in horizontal deflection of the electron beams impinging upon the phosphors in CRT 12. The alternating symmetrical deflection of the electron beams in relation to the location of the phosphor dots or stripes in CRT 12 results in equal reduction of emitted light intensity, provided the electron beams are aligned to the center of the respective phosphor dots without the magnetic field created by the wobulator inductor coils 192A, 192B. Any difference in light intensity would be an indication of discrepancy in beam landing. Similar measurements can be performed by wobulator coils arranged horizontally, resulting in an indication of vertical discrepancy of beam landing. Furthermore, a wobulator device 70 may contain two or more pairs of wobulator coils to perform similar test or alignment in their respective perpendicular direction. As described before, positioning components such as pneumatic cylinders 76 and 78 are provided to move the wobulator devices 70–74 out of the way of sensors 19 and to provide an unobstructed view whenever necessary.

It is apparent that there has been provided in accordance with this invention a system and method for testing and aligning electronic display devices such as color CRTs that satisfy the objects, means and advantages set forth hereinbefore. According to the invention, the system and method for testing and aligning the CRTs can perform all of the tests needed to precisely align a CRT and provide real-time feedback for operator adjustments. The system can integrate each of the measurements and can re-evaluate the measurements previously performed as required. An improved color CCD camera is provided which can maintain focus irrespective of variations in the thickness and glass curvature of the CRT screen. Further, photodiode optical filter and lens assemblies and wobulator assemblies can be incorporated into the system to further improve the testing and aligning of the CRTs.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A system for tesfing and aligning a CRT assembly mounted on a test fixture, comprising:

a video pattern generator to be connected to said CRT assembly for generating an image of a video pattern on said CRT assembly;

a plurality of optical sensor devices with independent fields of view, said optical sensor devices being mounted to said test fixture for sensing and producing image signals corresponding to separate details of said image of said video pattern on said CRT assembly, each of said optical sensor devices including a color CCD camera head;

camera head controllers each having a digital multiplexer to route digital information from said camera heads to a video input channel processor;

a computer including said video input channel processor to process said digital information, said computer executing a CRT assembly testing and alignment procedure; and a graphical user interface for guiding an operator performing adjustments on said CRT assembly through said CRT assembly testing and aligning procedure;

wherein each color CCD camera head includes a CCD device and a fixed lens element, said CCD device being movable relative to said fixed lens element in response to an associated camera head controller to change automatically focus of said CCD camera head.

2. The system for testing and aligning a CRT assembly of claim 1 wherein said optical sensor devices further include photodiode devices for measuring color purity and luminance.

3. The system for testing and aligning a CRT assembly of claim 1, wherein each CCD device is mounted on a slide assembly responsive to a drive, said slide assembly being slideable along an axis parallel to an optical axis extending through said CCD camera head.

4. The system for testing and aligning a CRT assembly of claim 3 including means to individually position each of said color CCD camera heads on said test fixture with respect to said CRT assembly to match specifications of a specific model of CRT assembly being tested.

5. The system for testing and aligning a CRT assembly of claim 4 wherein said test fixture includes a plurality of vertically spaced, generally horizontal supports, each of said supports supporting a plurality of CCD camera heads, said means to position individually said CCD camera heads including motors in said CCD camera heads controlled by said camera head controllers and actuable to move said CCD camera heads laterally along said supports.

6. The system for testing and aligning a CRT assembly of claim 2 wherein said photodiode devices are secured to respective color CCD camera heads.

7. The system for testing and aligning a CRT assembly of claim 2 further including a plurality of wobulator devices mounted on said test fixture to adjust the position of beam landing, within said CRT assembly affecting color purity.

8. The system for testing and aligning a CRT assembly of claim 7 wherein said wobulator devices are movable relative to said test fixture between operative positions where said wobulator devices are positioned adjacent said CRT assembly and inoperative positions where said wobulator devices are outside of the individual fields of view of said CCD camera heads.

9. The system for testing and aligning a CRT assembly of claim 5 wherein said supports are vertically adjustable.

10. The system for testing and aligning a CRT assembly of claim 6 further including a plurality of bandpass optical filters, each of said optical filters being located in front of a respective one of said photodiode devices.

11. A system for testing and aligning a CRT assembly comprising:

a video pattern generator to be connected to said CRT assembly for generating an image of a video pattern on said CRT assembly;

a plurality of optical sensor devices with independent fields of view, said optical sensor devices being mounted on a test fixture for sensing and producing image signals corresponding to separate details of said image of said video pattern on said CRT assembly, each of said optical sensor devices including a CCD camera head;

camera head controllers each having a digital multiplexer to route digital information from the CCD camera heads to a video input channel processor;

a computer including said video input channel processor to process said digital information, said computer executing a CRT assembly testing and alignment procedure; and a graphical user interface for guiding an operator performing adjustments on said CRT assembly through said CRT assembly testing and alignment procedure;

wherein said test fixture includes a plurality of vertically spaced, generally horizontal supports supporting said CCD camera heads, each of said CCD camera heads including an associated drive actuable in response to an associated camera head controller to move laterally said CCD camera head along said respective support thereby to allow each of said CCD camera heads to be individually positioned with respect to said CRT assembly under inspection.

12. A system as defined in claim 11 wherein said supports are vertically adjustable.

13. A system as defined in claim 11 further including photodiode devices for measuring colour purity and luminance.

14. A system as defined in claim 13 wherein said photodiode devices are secured to respective colour CCD camera heads.

15. A system as defined in claim 11 further including a plurality of wobulator devices mounted on said test fixture to adjust the position of beam landing within said CRT assembly affecting colour purity.

16. A system as defined in claim 15 wherein said wobulator devices are movable relative to said test fixture between operative positions where said wobulator devices are positioned adjacent said CRT assembly and inoperative positions where said wobulator devices are outside of the individual fields of view of said CCD camera heads.

* * * * *